Nov. 22, 1966  G. H. TOWNER  3,286,533
ANGLE READOUT TRANSDUCER
Filed May 20, 1963

GEORGE H. TOWNER
INVENTOR.

BY [signature]

AGENT 3,286,533
ANGLE READOUT TRANSDUCER
George H. Towner, Palos Verdes, Calif., assignor, by mesne assignments, to Thompson Ramo Wooldridge Inc., Cleveland, Ohio, a corporation of Ohio
Filed May 20, 1963, Ser. No. 281,719
14 Claims. (Cl. 74—5.6)

This invention relates to a positional angle readout transducer and more particularly to a simple electromagnetic device for accurately determining the spin axis of a rotating member.

In the general field of rotational equipment, there is a great need for accurately determining and locating the spin axis of a rotating element. For example, in the gyroscope field an output signal representative of the deviation between the spin axis of the rotating gyro and the support or reference mechanism is used as an indication of direction and position. In order to achieve a meaningful output signal, it is necessary to accurately determine and measure the position of the spin reference axis of the gyro. In the prior art this has been accomplished by restraining devices such as potentiometers, microsyn generators and other readout devices physically attached to the rotating gyro member. Optical techniques cooperating with prealigned marks on rotating gyros have also been used where physical restraints were considered objectionable.

In this invention, a simple electromagnetic device which is free of all mechanical connections and markings whether they be electrical or optical is disclosed for accurately determining the spin reference axis of the rotating mass.

The invention contemplates the use of at least three concentric coils having their axes mutually perpendicular. The rotating mass may be of any electrically conducting mass of revolution spinning at the center of the coils. In the preferred example, a spherical rotor completely free of all markings and mechanically attached readout devices is located concentric with and within the defined coils. The conducting surface of revolution spinning at the center of the coils may be interpreted in terms of the spin reference vector. One coil which may be identified as a primary coil P is connected to an alternating voltage source. The output voltages resulting in the other two coils generally identified as the secondary coils $S_1$ and $S_2$ contain the positional information and have the same frequency as the primary excitation voltage.

The invention is particularly adaptable for use in a precise two-axis inertial angular reference gyro of minimum complexity by using orthogonally oriented coils for locating the spin reference axis of the rotating gyro. The improved gyro represents an improvement over the basic two-degree-of-freedom "free rotor" gyros such as the electrically and/or magnetically suspended gyro or the spinning case air bearing gyro.

Further objects and advantages of the invention will be made more apparent by referring now to the accompanying drawings, wherein.

The advantages of this invention are more readily apparent when considering the problem of reading the spin axis vector direction of a rotating sphere suspended in a high vacuum by an electric field or suspended by an air bearing. The sphere must be free of all mechanical connections and negligibly torqued. The sphere must also be unmarked electrically or optically, since markings tend to cause mass unbalance or extraneous interactions with the high intensity electrical suspension fields if suspended in an electrical field. Since it is possible to readout the spin axis vector direction of any surface of revolution about the spin axis, it is possible, for example, to read the actual alignment direction and speed of rotating members. This invention also gives rotational velocity magnitude and nutation.

To utilize the gyro rotor positional information it is necessary to measure the spin axis direction relative to the gyro case. It is advisable not to mark the surface of the sphere as taught by the prior art since these markings cause distortion of the electric suspension fields that could produce rotor unbalance. Even if the markings do not cause appreciable drift, the high degree of precision necessary to mark the rotor so that the high performance of the gyro can be realized is eliminated. The fact that the rotor is suspended inside a vacuum for the example given further complicates the readout problem.

Figure 1:
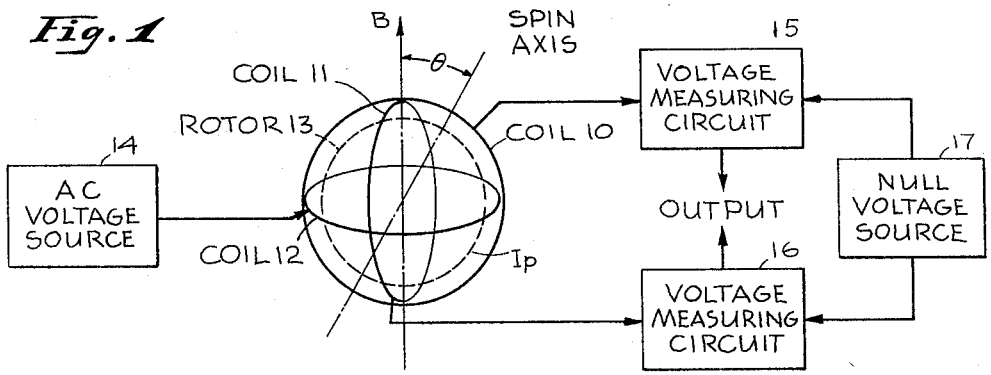
FIG. 1 is a schematic diagram illustrating the basic concepts of the invention.

Referring now to FIG. 1, there is shown an electromagnetic readout system comprising three coils 10, 11 and 12 having their axes mutually perpendicular and intersecting at the center of a spherical rotor 13. The coils 10, 11 and 12 are each represented as a single turn for ease of illustration. It will be appreciated that while the coils 10, 11 and 12 are concentric with the rotor 13 that only the rotor is within the low friction support mechanism (not illustrated). The individual coils 10, 11 and 12 may all be located outside the supports necessary to hold the rotor 13.

As will be apparent to those skilled in the art, there are many ways available for rotating the rotor 12 up to speed in a low friction bearing environment. For example, by considering an electrostatic suspension environment in which the rotor 13 is supported in a hard vacuum it is possible to initially use the coils 10, 11 and 12 as follows:

(1) To spin up the gyro rotor,
(2) To measure the angular position of the rotor spin axis,
(3) To torque the rotor so as to change the direction of the rotor spin axis in inertial space, and
(4) To initially align the rotor spin vector direction.

All of these functions are accomplished with an unmarked spherical conducting rotor.

To spin up the gyro rotor, low frequency current may be applied in quadrature to any two coils, for example coils 10 and 11. This produces a torque about an axis normal to the axis of these two coils which is used to spin up the gyro rotor 13. Once up to speed, these excitations are removed. The direction of the spin axis can be varied by applying D.C. currents simultaneously to one coil, say coil 12, and one of the other coils depending on the direction the spin axis is to be precessed. It is possible of course, to initially rotate the rotor 13 by any means available.

In accordance with the principles of this invention a substantially low frequency A.C. voltage source having a frequency of about 50 cycles to 300 cycles is connected to coil 12. The resulting current in coil 12 induces voltages in coils 10 and 11 which vary as a function of the direction of the spin axis relative to the three orthogonal coils 10, 11 and 12. In this mode of operation, the magnetic flux generated by the excitation coil 12 generates useful circulating currents in the spinning rotor 13 provided the rotor spin axis is not parallel to the coil axis. These currents on the spinning sphere of the rotor 13 generate a voltage producing flux that couples into coils 10 and 11. If the spin axis is aligned with the axis of the excitation coil 12, no readout currents are induced in the rotor 13, and no coupling exists between any residual rotor currents and coils 10 and 11. The voltages resulting in the other coils 10 and 11 are measured in voltage measuring circuits 15 and 16 respectively and represent the output information. The output information is considered more useful by using the device as a null seeker. For example, after the rotor 13 is up to speed and has a preferred spin axis a null voltage source 17, feeding voltage measuring circuits 15 and 16 is adjusted to generate an equal and opposite voltage for each circuit where the output signal from each circuit is zero.

The output voltages from coils 10 and 11 can be shown to approximate the arcsine of the two orthogonal direction angles measured from the primary coil axis direction of coil 12. A small correction term is required for accurate readout of large angles, which involves the cosines of the output angles. By interchanging the coils through lead wire connection changes and by connecting coils in series or parallel, angular displacements of 22.5 degrees in apparent coil location are achievable. With the above means, the readout angles relative to coil effective axes can be maintained below 23 degrees and the arcsine can be considered the angle itself, provided the error is split. Absolute outputs at any angle of approximately 2 arc minutes are therefore obtainable. The arcsine to sine correction factor may be generated for more accurate outputs, and may be generated up to 23 degrees with low precision components. The readout angles are not coplanar with the secondary coils due to the current to initial velocity induced voltage time phase lag in the gyro rotor. This lag also accounts for the required cosines mentioned above.

Figure 2:
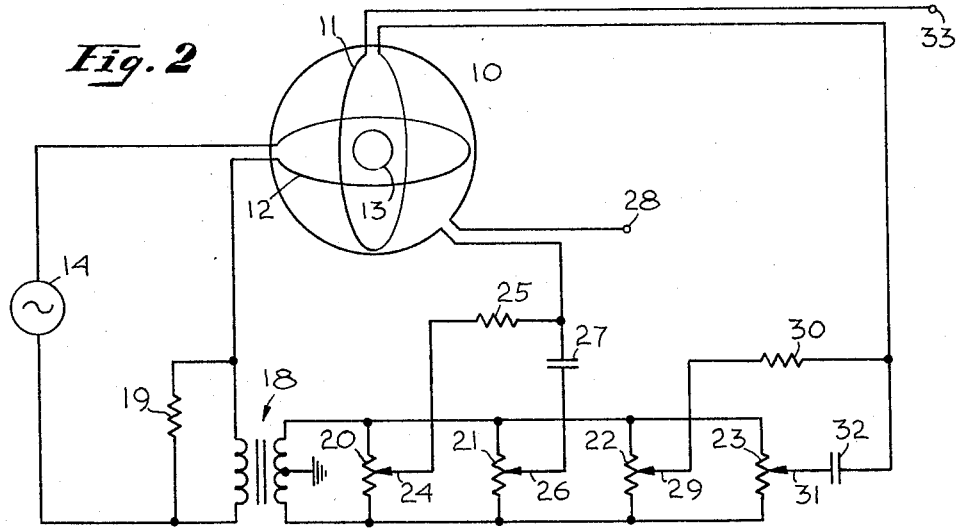
FIG. 2 is a circuit diagram illustrating a preferred mode of using this invention.

Referring now to FIG. 2 there is shown a schematic diagram more fully illustrating the circuits illustrated in FIG. 1. FIG. 2 illustrates a preferred means for exciting the coils 12 from an A.C. voltage source 14. A portion of the applied voltage from the source 14 is developed across the primary of a transformer 18 and is used as the source of the bucking voltage for nulling the output signals. A decoupling resistor 19 is connected across the primary of the transformer 18 in order to isolate transformer unbalances from affecting the voltage in coil 12. The output from the transformer 18 is obtained from a conventional center tapped coil which is connected across variable resistors 20, 21, 22 and 23. A movable operating arm 24 associated with resistor 20 is connected to one end of a resistor 25, the other end of which is connected to one end of the coil 10. A movable operating arm 26 associated with resistor 21 is connected to one end of a capacitor 27, the other end of which is connected to the junction of the resistor 25 and the coil 10. The free end of the coil 10 is an output terminal 28. The connections for coil 11 are obtained in a similar manner as just described for coil 10. A movable operating arm 29 associated with resistor 22 is connected to one end of a resistor 30, the other end of which is connected to one end of the coil 11. A movable operating arm 31 associated with resistor 23 is connected to one end of a capacitor 32, the other end being connected to the junction of resistor 30 and the coil 11. The free end of the coil 11 is an output terminal 33.

In operation the spin axis of the rotor 13 is preferably aligned with the axis of the driving coil 12. This may be accomplished by external means such as by applying a driving voltage across coil 12 and either coil 10 or 11 and operating the rotor 13 as a conventional squirrel cage motor. Once the rotor 13 is aligned and up to speed a voltage from source 14 is impressed across coil 12. Resistors 20 and 21 are adjusted until the value and phase of the bucking voltage feeding coil 10 is equal and opposite to the induced voltage which is indicated as a null at the output of terminal 28. The same procedure is followed in connection with coil 11 by adjusting resistors 22 and 23 for a null at terminal 33. Any deviation in the voltage vector generated by coil 12 relative to the spin axis of the rotating gyro rotor 13 will be indicated by a voltage and phase change at the terminals 28 and 33.

There are many variations and techniques available, for example the three coils 10, 11 and 12 can be located on a three axis follow-up servo system or platform and in which the servos moved in such a direction as to keep the voltages induced in the secondary coils 10 and 11 equal to zero. In this arrangement there will be no net torque exerted on the rotor 13. As an alternative the coils may be connected to electrical resolvers in such a way that their net resultant vector magnetic direction is rotated by servos (or manual) turning the resolver shafts; hence eliminating the above platform. In an effort to improve accuracies and keep the angles less than 22 degress in order that the measured voltages indicate the angles and not the sine of the angle it is proposed to add two additional coils at the intersections of each pair of the original coils and perpendicular to the other coil, making a total of nine coils. By switching coil connections and changing which coils are primary and active secondaries, the output angles can be kept less than 23 degrees. With more elaborate switching, angles can be kept less than 12 degrees, with resulting increases in accuracy, correction factor generation and reduced loading torques. It can also be shown that apparent coils are produced midway between connected coils if the two connected coils are either in series or in parallel. This technique may require locating the two direction angles from different coil references resulting in scale factor changes.

Improved accuracy is possible for these applications not requiring continuous readout by controlling the on time and hence the duty cycle. At any given time the error angles are not zero which results in a torque on the rotor. This torque may be reduced by operating coil 12 at the lowest possible level of primary excitation. If primary excitation is pulsed to reduce the duty cycle, larger magnitudes of excitation may be used and a better signal to noise ratio relative to angle detection may be achieved.

Figure 3:
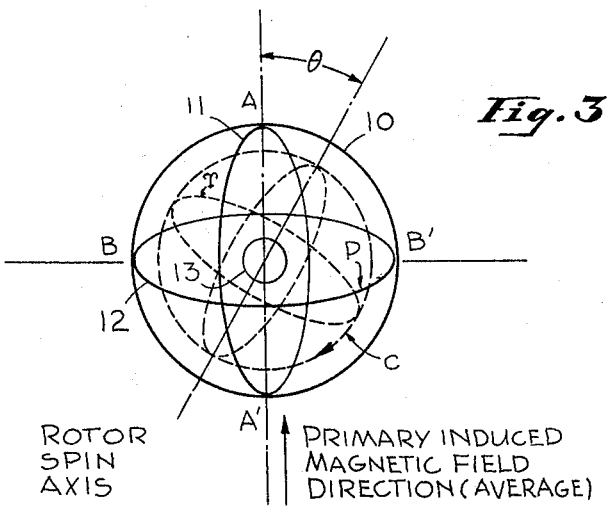
FIG. 3 illustrates the voltages induced in the fixed coils by the spinning rotor.

Referring now to FIG. 3, there is shown a diagram of the coils 10, 11 and 12 and the spinning rotor 13.

If one makes the assumption that spin and excitation angular velocities are low compared to the finite resistivity of the spherical rotor 13, the output voltages are produced as follows. The primary coil 12 induces an alternating direction with time magnetic field parallel to the AA' axis. If a closed loop in a great circle plane of the rotor 13 which is also parallel to the spin axis considered, it will be observed that the time rate of change of flux passing through the loop is finite and maximum when the plane is parallel to the AA' and BB'. (It is assumed tha $m$ lies in the plane parallel to AA' and BB'.) The changing flux induces current throughout the sphere which tends to act like a net current flowing around the spherical center and in a plane parallel to AA' and BB'. The current is alternating and it induces a changing magnetic field with time that stands still in space and which passes through coil 10. Coil 10 then has a voltage induced in it that is the excitation frequency, and its magnitude is proportional to the sine of angle $\theta$ and to the rotor angular velocity. If angle $\theta$ lies outside of plane AA' BB' current is induced correspondingly in coil 11 also. The current induced in the rotor 13 contains the sum and difference frequencies of the spin and excitation angular velocities. At higher frequencies or lower rotor resistivities coils 10 and 11 have to be rotated about AA' to produce correct readings. There is also a net effective current produced that lies in the plane of the primary coil 12, and which goes around the spherical center. This current has a negligible effect at low frequencies, except for heating and partial cancellation of the primary induced magnetic field. This current is produced even if the rotor is not spining.

This completes the description of the embodiment of the invention illustrated herein. However, many modifications and advantages thereof will be apparent to per- The embodiments of the invention in which an exclusive property or privilege is claimed are defined as follows:

1. In combination,
    at least three coils having mutually perpendicular axes,
    a rotating mass spinning about the center of said coils,
    said mass having electrically conducting portions.

2. In combination,
    at least three orthogonally orientated coils having a fixed center, and
    a rotating mass having electrically conductive portions spinning about said center.

3. In combination,
    at least three coils having mutually perpendicular axes intersecting at a fixed center, and
    a spherical rotating mass being electrically conductive and spinning about said center.

4. In combination,
    a first, second and third coil orthogonally oriented with respect to each other for defining a fixed center,
    means for generating a potential across said first coil,
    an electrically conductive rotating mass spinning at said center, and
    means for measuring induced voltages in said second and third coils as a measure of the position of the spin reference axis of said rotating mass.

5. In combination,
    at least three concentric coils having mutually perpendicular axes, and
    a rotating mass having substantially uniform conductivity spinning about the center of said coils.

6. In combination,
    at least three concentric coils having mutually perpendicular axes, and
    a rotating spherical mass concentric with said coils rotating about the center of said coils.

7. In combination,
    at least three concentric coils having mutually perpendicular axes,
    means for generating an alternating potential across one of said coils,
    a rotating mass having electrically conductive portions spinning about the center of said coils, and
    means for measuring induced voltages in said other coils as a measure of the position of the spin reference axis of said rotating mass.

8. A combination according to claim 7 in which said rotating mass is a rotating spherical mass concentric with and within said concentric coils.

9. In combination,
    a substantially frictionless supported spinning mass having electrically conducting portions,
    means comprising an input coil and alternating voltage source for generating a magnetic field in flux linking relationship with said spinning mass and having a direction determined by the perpendicular axis of said input coil, and
    means comprising a plurality of output coils in flux linking relationship with said spinning mass for providing output signals indicative of positional changes between the axes of all coils and the spin axis of said mass.

10. A combination according to claim 9 in which said spinning mass is spherical.

11. A combination according to claim 9 in which said input coil and said output coils are concentric with said spinning mass.

12. A combination according to claim 9 in which the axes of said input coil and said output coils are mutually perpendicular and intersect at a point, and said spinning mass is spinning about said point.

13. In combination,
    a first, second and third coil orthogonally oriented with respect to each other for defining a fixed center,
    means for generating a potential across said first coil,
    an electrically conductive rotating mass spinning at said center,
    means for generating a separate bias voltage,
    means for combining said bias voltage with induced voltages in said second and third coils,
    and means for measuring said combined voltages in each of said second and third coils as a function of the null position of said rotating mass.

14. A combination according to claim 13 in which said bias voltages are generated from the current flowing through said first coil.

References Cited by the Examiner

UNITED STATES PATENTS

| | | | |
|---|---|---|---|
| 2,785,573 | 3/1957 | Bentley | 74—5.6 X |
| 2,942,479 | 6/1960 | Hollmann | 74—5.6 |
| 2,949,780 | 8/1960 | Williams | 74—5.34 X |
| 3,105,657 | 10/1963 | Mueller et al. | 74—5.7 X |

FRED C. MATTERN, JR., *Primary Examiner.*

BROUGHTON G. DURHAM, *Examiner.*

T. W. SHEAR, J. D. PUFFER, *Assistant Examiners.*